United States Patent
Ye et al.

(10) Patent No.: US 10,708,087 B2
(45) Date of Patent: Jul. 7, 2020

(54) SOUNDING REFERENCE SYMBOL TRANSMISSION METHOD AND RADIO REMOTE UNIT

(71) Applicant: Huawei Technologies Co., Ltd., Shenzhen (CN)

(72) Inventors: Wei Ye, Beijing (CN); Xuzhen Wang, Beijing (CN); Wei Chen, Shanghai (CN); Guangsheng Lei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/010,161

(22) Filed: Jun. 15, 2018

(65) Prior Publication Data

US 2018/0302248 A1    Oct. 18, 2018

Related U.S. Application Data

(63) Continuation of application No. PCT/CN2015/097660, filed on Dec. 17, 2015.

(51) Int. Cl.
*H04L 25/02* (2006.01)
*H04B 10/25* (2013.01)
(Continued)

(52) U.S. Cl.
CPC ......... *H04L 25/0226* (2013.01); *H04B 10/25* (2013.01); *H04L 5/005* (2013.01);
(Continued)

(58) Field of Classification Search
CPC ... H04L 25/0226; H04L 5/0023; H04L 5/005; H04L 5/0051; H04B 10/25; H04W 88/085; H04W 92/12
See application file for complete search history.

(56) References Cited

U.S. PATENT DOCUMENTS 4,286,294 A * 8/1981 Nakauchi ............ G11B 20/225
360/27
8,989,088 B2 3/2015 Ling
(Continued)

FOREIGN PATENT DOCUMENTS

CN    102291855 A    12/2011
CN    102833000 A    12/2012
(Continued)

*Primary Examiner* — Kevin D Mew
(74) *Attorney, Agent, or Firm* — Leydig, Voit & Mayer, Ltd.

(57) ABSTRACT

Embodiments of the present invention disclose a sounding reference symbol SRS transmission method and a radio remote unit. The method, performed by a radio remote unit, includes: receiving a plurality of pieces of sampled data in a first period by using each antenna of an antenna array; if all of the plurality of pieces of sampled data are the SRS sampled data, buffering the plurality of pieces of sampled data; and reading the plurality of pieces of sampled data from the buffer in a second period, and sending the read plurality of pieces of sampled data to a baseband processing unit, where duration of the second period is longer than duration of the first period. Thus according the embodiments of the present invention, a time for transmitting the SRS sampled data is prolonged, so that bandwidth required for transmitting the SRS sampled data can be reduced.

16 Claims, 5 Drawing Sheets

(51) Int. Cl.
*H04L 5/00* (2006.01)
*H04W 88/08* (2009.01)
*H04W 92/12* (2009.01)

(52) U.S. Cl.
CPC .......... *H04L 5/0023* (2013.01); *H04L 5/0051* (2013.01); *H04W 88/085* (2013.01); *H04W 92/12* (2013.01)

(56) References Cited

U.S. PATENT DOCUMENTS

| | | | |
|---|---|---|---|
| 9,119,097 B2* | 8/2015 | Chatterjee | H04W 28/02 |
| 9,154,267 B2* | 10/2015 | He | H04W 28/08 |
| 10,028,299 B2* | 7/2018 | Cai | H04W 72/1268 |
| 2011/0116436 A1* | 5/2011 | Bachu | H04L 5/0048 |
| | | | 370/312 |
| 2012/0294249 A1 | 11/2012 | Yu | |
| 2013/0017852 A1* | 1/2013 | Liu | H04W 88/085 |
| | | | 455/509 |
| 2013/0083768 A1* | 4/2013 | Liu | H04L 27/2636 |
| | | | 370/330 |
| 2013/0242911 A1* | 9/2013 | Heo | H04L 5/001 |
| | | | 370/329 |
| 2014/0003262 A1* | 1/2014 | He | H04W 28/08 |
| | | | 370/252 |
| 2014/0120947 A1* | 5/2014 | Siomina | G01S 5/0221 |
| | | | 455/456.1 |
| 2015/0085690 A1* | 3/2015 | Yi | H04L 25/0224 |
| | | | 370/252 |
| 2015/0304867 A1* | 10/2015 | Aulin | H04B 7/024 |
| | | | 370/252 |
| 2016/0259038 A1* | 9/2016 | Retterath | G01S 7/4802 |
| 2017/0265212 A1* | 9/2017 | Zhang | H04L 5/0048 |
| 2018/0138957 A1* | 5/2018 | Wang | H04B 7/0615 |
| 2019/0116568 A1* | 4/2019 | Fertonani | H04W 56/00 |

FOREIGN PATENT DOCUMENTS

| | | |
|---|---|---|
| CN | 103428149 A | 12/2013 |
| CN | 103546402 A | 1/2014 |
| CN | 104853417 A | 8/2015 |
| WO | 2015087307 A1 | 6/2015 |

* cited by examiner

SOUNDING REFERENCE SYMBOL TRANSMISSION METHOD AND RADIO REMOTE UNIT

CROSS-REFERENCE TO RELATED APPLICATIONS

This application is a continuation of International Application No. PCT/CN2015/097660, filed on Dec. 17, 2015, the disclosure of which is hereby incorporated by reference in its entirety.

TECHNICAL FIELD

Embodiments of the present invention relate to the field of communications technologies, and specifically, to a sounding reference symbol transmission method and a radio remote unit.

BACKGROUND

A sounding reference symbol (SRS) is a symbol that is sent by a user terminal to a base station and that is used for detecting a status of a channel between the user terminal and the base station. Generally, the SRS is a last symbol of an uplink subframe. An uplink subframe includes a plurality of symbols, and a symbol includes a plurality of pieces of sampled data. In a distributed base station architecture of BBU-RRU (baseband processing unit-radio remote unit), an RRU receives, by using a large scale antenna array, SRS sampled data sent by the user terminal, and sends, by using an optical fiber, the SRS sampled data to a BBU for processing.

It is found in practice that the RRU usually receives a large amount of SRS sampled data by using the large scale antenna array. For example, when the large scale antenna array includes 256 antennas, the RRU receives, in parallel by using the large scale antenna array, 256 pieces of SRS sampled data sent by a user terminal. In actual application, the radio remote unit needs to send, at the same time, the large amount of SRS sampled data received in parallel to the BBU for processing, and therefore, excessively high bandwidth is required for transmitting the SRS sampled data by the radio remote unit, and a relatively high requirement is imposed on network deployment.

SUMMARY

Embodiments of the present invention disclose a sounding reference symbol transmission method and a radio remote unit, so that bandwidth required for transmitting SRS sampled data can be reduced, thereby helping lower a network deployment requirement.

A first aspect of the embodiments of the present invention discloses a sounding reference symbol transmission method. The method includes:

receiving, by a radio remote unit, a plurality of pieces of sampled data in a first period by using each antenna of an antenna array;

identifying, by the radio remote unit, whether all of the plurality of pieces of sampled data are sounding reference symbol SRS sampled data;

if all of the plurality of pieces of sampled data are the SRS sampled data, buffering, by the radio remote unit, the plurality of pieces of sampled data into a buffer; and reading, by the radio remote unit, the plurality of pieces of sampled data from the buffer in a second period, and sending the read plurality of pieces of sampled data to a baseband processing unit, where duration of the second period is longer than duration of the first period. In this way, the plurality of pieces of SRS sampled data are buffered, and a time for transmitting the SRS sampled data is prolonged, so that bandwidth required for transmitting the SRS sampled data can be reduced, thereby helping lower a network deployment requirement.

In a first possible implementation of the first aspect of the embodiments of the present invention, before the receiving, by a radio remote unit, a plurality of pieces of sampled data in a first period by using each antenna of an antenna array, the method further includes:

receiving, by the radio remote unit, identification information that is sent by the baseband processing unit and that is used for identifying SRS sampled data, where the identification information includes a receiving time point and a time length; and the identifying, by the radio remote unit, whether all of the plurality of pieces of sampled data are sounding reference symbol SRS sampled data includes:

detecting, by the radio remote unit, whether a receiving time of each of the plurality of pieces of sampled data is later than the receiving time point, and whether a time interval between the receiving time of each piece of sampled data and the receiving time point is less than the time length; and if the receiving time of each piece of sampled data is later than the receiving time point, and the time interval between the receiving time of each piece of sampled data and the receiving time point is less than the time length, determining, by the radio remote unit, that all of the plurality of pieces of sampled data are the SRS sampled data. In this way, whether all of the received plurality of pieces of sampled data are the SRS sampled data can be accurately identified.

In a second possible implementation of the first aspect of the embodiments of the present invention, a rate of processing SRS sampled data by the baseband processing unit is less than a rate of receiving SRS sampled data by the radio remote unit; and a rate of sending, by the radio remote unit to the baseband processing unit, the SRS sampled data that is read from the buffer is less than or equal to the rate of processing SRS sampled data by the baseband processing unit. In this way, the rate of sending SRS sampled data by the radio remote unit to the baseband processing unit is less than or equal to the rate of processing SRS sampled data by the baseband processing unit, so that the baseband processing unit does not need to buffer sampled data that cannot be processed in time, and therefore, the baseband processing unit can save buffer resources.

With reference to the first aspect of the embodiments of the present invention, the first possible implementation of the first aspect, or the second possible implementation of the first aspect, in a third possible implementation of the first aspect of the embodiments of the present invention, the buffering, by the radio remote unit, the plurality of pieces of sampled data into a buffer includes:

grouping, by the radio remote unit, the plurality of pieces of sampled data, to obtain a plurality of groups of sampled data;

for each of the groups of sampled data, compressing, by the radio remote unit, sampled data included in the group of sampled data, to obtain compressed sampled data corresponding to the group of sampled data; and buffering, by the radio remote unit, the compressed sampled data corresponding to each of the groups of sampled data into the buffer; and the reading, by the radio remote unit, the plurality of pieces of sampled data from the buffer in a second period, and sending the read plurality of pieces of sampled data to a baseband processing unit includes:

reading, by the radio remote unit from the buffer in the second period, the compressed sampled data corresponding to each of the groups of sampled data, and sending the read compressed sampled data corresponding to each of the groups of sampled data to the baseband processing unit. In this way, the received plurality of pieces of sampled data are grouped and compressed, an amount of SRS sampled data processed by the baseband processing unit can be reduced, and complexity of processing the SRS sampled data by the baseband processing unit is significantly reduced. In addition, a size of SRS sampled data can be reduced by compressing SRS sampled data, thereby helping reduce bandwidth for transmitting SRS sampled data. In addition, the radio remote unit sends all the compressed sampled data to the baseband processing unit for processing, thereby helping reduce a loss of sampled data.

With reference to the first aspect of the embodiments of the present invention, the first possible implementation of the first aspect, or the second possible implementation of the first aspect, in a fourth possible implementation of the first aspect of the embodiments of the present invention, the reading, by the radio remote unit, the plurality of pieces of sampled data from the buffer in a second period, and sending the read plurality of pieces of sampled data to a baseband processing unit includes:

reading, by the radio remote unit, the plurality of pieces of sampled data from the buffer in the second period in a downlink timeslot, and sending the read plurality of pieces of sampled data to the baseband processing unit. In this way, the SRS sampled data in the buffer is sent to the baseband processing unit in the downlink timeslot, a waste of optical fiber resources can be reduced, and in addition, a time for transmitting the SRS sampled data can be prolonged, thereby reducing bandwidth required for transmitting the SRS sampled data.

A second aspect of the embodiments of the present invention discloses a radio remote unit. The radio remote unit includes:

a receiving module, configured to receive a plurality of pieces of sampled data in a first period by using each antenna of an antenna array;

an identification module, configured to identify whether all of the plurality of pieces of sampled data are sounding reference symbol SRS sampled data;

a buffering module, configured to: when the identification module identifies that all of the plurality of pieces of sampled data are the SRS sampled data, buffer the plurality of pieces of sampled data into a buffer; and a sending module, configured to: read the plurality of pieces of sampled data from the buffer in a second period, and send the read plurality of pieces of sampled data to a baseband processing unit, where duration of the second period is longer than duration of the first period. In this way, the plurality of pieces of SRS sampled data are buffered, and a time for transmitting the SRS sampled data is prolonged, so that bandwidth required for transmitting the SRS sampled data can be reduced, thereby helping lower a network deployment requirement.

In a first possible implementation of the second aspect of the embodiments of the present invention, the receiving module is further configured to: before the receiving module receives the plurality of pieces of sampled data in the first period by using each antenna of the antenna array, receive identification information that is sent by the baseband processing unit and that is used for identifying SRS sampled data, where the identification information includes a receiving time point and a time length; and the identification module includes:

a detection unit, configured to detect whether a receiving time of each of the plurality of pieces of sampled data is later than the receiving time point, and whether a time interval between the receiving time of each piece of sampled data and the receiving time point is less than the time length; and a determining unit, configured to: when the detection unit detects that the receiving time of each piece of sampled data is later than the receiving time point, and the time interval between the receiving time of each piece of sampled data and the receiving time point is less than the time length, determine that all of the plurality of pieces of sampled data are the SRS sampled data. In this way, whether all of the received plurality of pieces of sampled data are the SRS sampled data can be accurately identified.

In a second possible implementation of the second aspect of the embodiments of the present invention, a rate of processing SRS sampled data by the baseband processing unit is less than a rate of receiving SRS sampled data by the receiving module; and a rate of sending, by the sending module to the baseband processing unit, the SRS sampled data that is read from the buffer is less than or equal to the rate of processing SRS sampled data by the baseband processing unit. In this way, the rate of sending SRS sampled data by the radio remote unit to the baseband processing unit is less than or equal to the rate of processing SRS sampled data by the baseband processing unit, so that the baseband processing unit does not need to buffer sampled data that cannot be processed in time, and therefore, the baseband processing unit can save buffer resources.

With reference to the second aspect of the embodiments of the present invention, the first possible implementation of the second aspect, or the second possible implementation of the second aspect, in a third possible implementation of the second aspect of the embodiments of the present invention, the buffering module includes:

a grouping unit, configured to group the plurality of pieces of sampled data, to obtain a plurality of groups of sampled data;

a compression unit, configured to: for each of the groups of sampled data, compress sampled data included in the group of sampled data, to obtain compressed sampled data corresponding to the group of sampled data; and a buffering unit, configured to buffer the compressed sampled data corresponding to each of the groups of sampled data into the buffer; and the sending module is specifically configured to:

read, from the buffer in the second period, the compressed sampled data corresponding to each of the groups of sampled data, and send the read compressed sampled data corresponding to each of the groups of sampled data to the baseband processing unit. In this way, the received plurality of pieces of sampled data are grouped and compressed, an amount of SRS sampled data processed by the baseband processing unit can be reduced, and complexity of processing the SRS sampled data by the baseband processing unit is significantly reduced. In addition, a size of SRS sampled data can be reduced by compressing SRS sampled data, thereby helping reduce bandwidth for transmitting SRS sampled data. In addition, the radio remote unit sends all the compressed sampled data to the baseband processing unit for processing, thereby helping reduce a loss of sampled data.

With reference to the second aspect of the embodiments of the present invention, the first possible implementation of the second aspect, or the second possible implementation of the second aspect, in a fourth possible implementation of the second aspect of the embodiments of the present invention, the sending module is specifically configured to:

read the plurality of pieces of sampled data from the buffer in the second period in a downlink timeslot, and send the read plurality of pieces of sampled data to the baseband processing unit. In this way, the SRS sampled data in the buffer is sent to the baseband processing unit in the downlink timeslot, a waste of optical fiber resources can be reduced, and in addition, a time for transmitting the SRS sampled data can be prolonged, thereby reducing bandwidth required for transmitting the SRS sampled data.

A third aspect of the embodiments of the present invention discloses a base station. The base station includes an antenna array, a baseband processing unit, and the radio remote unit according to the second aspect, the first possible implementation of the second aspect, the second possible implementation of the second aspect, the third possible implementation of the second aspect, or the fourth possible implementation of the second aspect. The antenna array is connected to the radio remote unit, and the radio remote unit is connected to the baseband processing unit.

In the embodiments of the present invention, after receiving the plurality of pieces of sampled data in the first period by using each antenna of the antenna array, the radio remote unit identifies whether all of the plurality of pieces of sampled data are sounding reference symbol SRS sampled data. If all of the plurality of pieces of sampled data are the SRS sampled data, the radio remote unit buffers the plurality of pieces of sampled data into the buffer. The radio remote unit reads the sampled data in the second period whose duration is longer than that of the first period, and sends the read sampled data to the baseband processing unit. According to implementation of the embodiments of the present invention, after the radio remote unit buffers the plurality of pieces of sampled data, a time for transmitting the SRS sampled data is prolonged, so that bandwidth required for transmitting the SRS sampled data can be reduced, thereby helping lower a network deployment requirement.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention disclose a sounding reference symbol transmission method and a radio remote unit, so that bandwidth required for transmitting SRS sampled data can be reduced, thereby helping lower a network deployment requirement. For a better understanding of the embodiments of the present invention, the following first describes an application scenario of the embodiments of the present invention.

Figure 1:
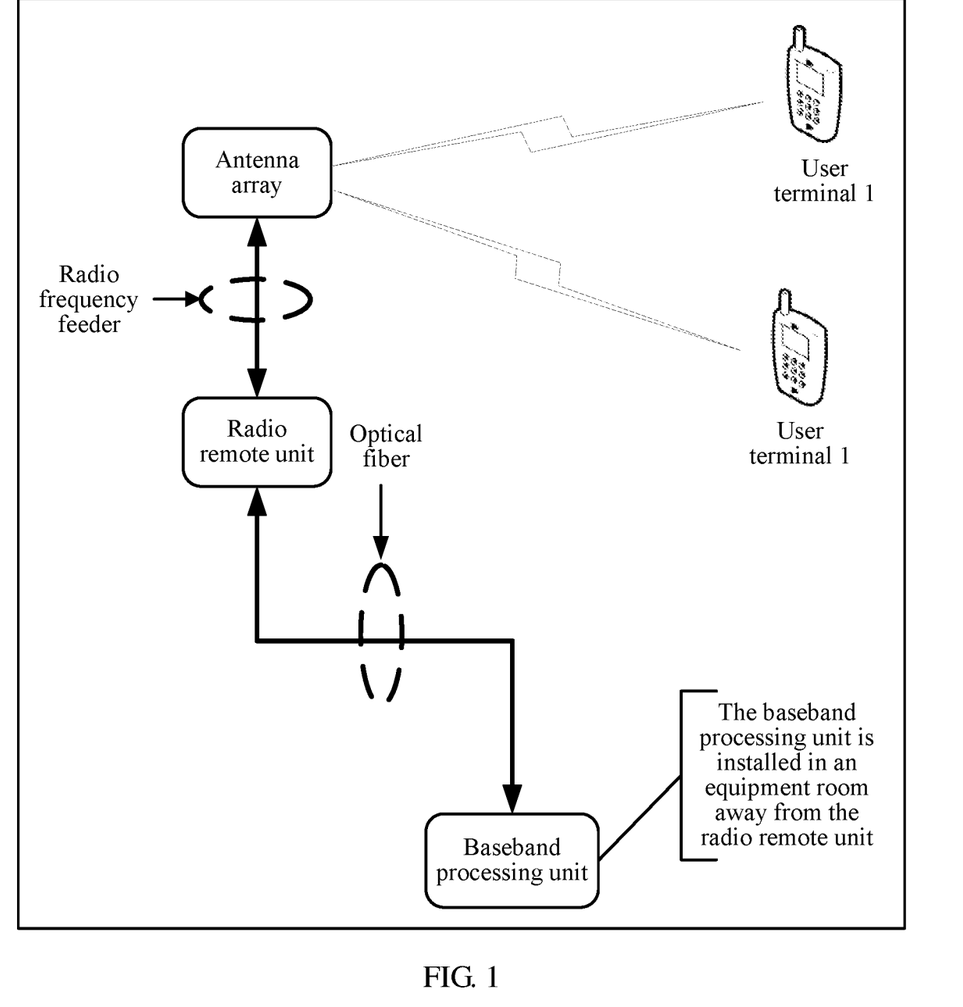
FIG. 1 is a schematic diagram of an application scenario according to an embodiment of the present invention.
Figure 2:
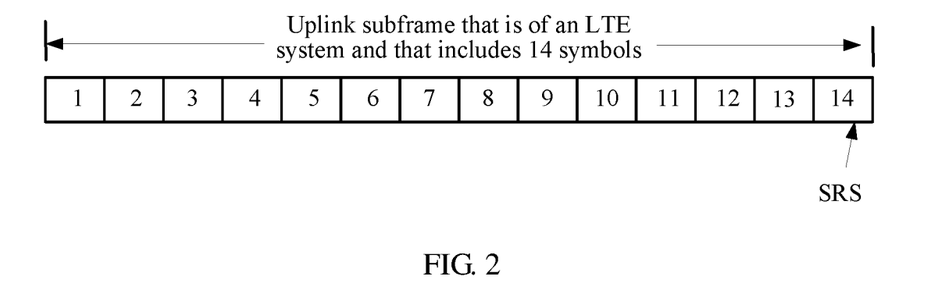
FIG. 2 is a schematic diagram of an uplink subframe that is in an LTE system and that includes an SRS according to an embodiment of the present invention.

Referring to FIG. 1, FIG. 1 is a schematic diagram of an application scenario according to an embodiment of the present invention. In the application scenario shown in FIG. 1, a base station includes an antenna array, a radio remote unit, and a baseband processing unit. There are wireless connections between the antenna array and a plurality of user terminals (such as a smartphone, a tablet computer, a palmtop computer, a super mobile personal computer, a netbook, or a mobile Internet device). The radio remote unit is connected to the antenna array by using a radio frequency feeder. Generally, the radio remote unit is installed on a tower top near an antenna, to reduce a feeder loss. The baseband processing unit is installed in an equipment room away from the radio remote unit (usually installed in a centralized equipment room that is 1 km or more away from the radio remote unit), and the baseband processing unit is connected to the radio remote unit by using an optical fiber. In the application scenario shown in FIG. 1, the plurality of user terminals send sounding reference symbols (SRS) to the antenna array at the same time. The SRS is located at a last symbol of a common uplink subframe in a Long Term Evolution (LTE) system. Alternatively, the SRS may be located at a last symbol or last two symbols of an uplink pilot timeslot (upPTS) of a special uplink subframe. The uplink subframe of the LTE system includes 14 symbols, and each symbol includes a plurality of pieces of sampled data. Therefore, each SRS includes a plurality of pieces of sampled data. As shown in FIG. 2, FIG. 2 is a schematic diagram of an uplink subframe that is in an LTE system and that includes an SRS according to an embodiment of the present invention. In the application scenario shown in FIG. 1, when sending sampled data of a symbol of the uplink subframe, the user terminal sends a piece of sampled data of the symbol to each antenna of the antenna array at the same time. For example, for the uplink subframe shown in FIG. 2, the user terminal first sends the first piece of sampled data of the first symbol to each antenna of the antenna array at the same time, and then sends the second piece of sampled data of the first symbol to each antenna of the antenna array at the same time until all sampled data of the first symbol is sent. Then the user terminal sends the first piece of sampled data of the second symbol to each antenna of the antenna array at the same time, and so on, until sampled data of all symbols of the uplink subframe is sent. Therefore, if the antenna array includes 256 antennas, the antenna array receives, at the same time, 256 pieces of sampled data sent by a same user terminal. After receiving a plurality of pieces of sampled data at the same time, the antenna array sends the plurality of pieces of sampled data to the radio remote unit at the same time by using the radio frequency feeder; and after receiving the plurality of pieces of sampled data at the same time, the radio remote unit sends, by using the optical fiber, the plurality of pieces of sampled data to the baseband processing unit.

Figure 3:
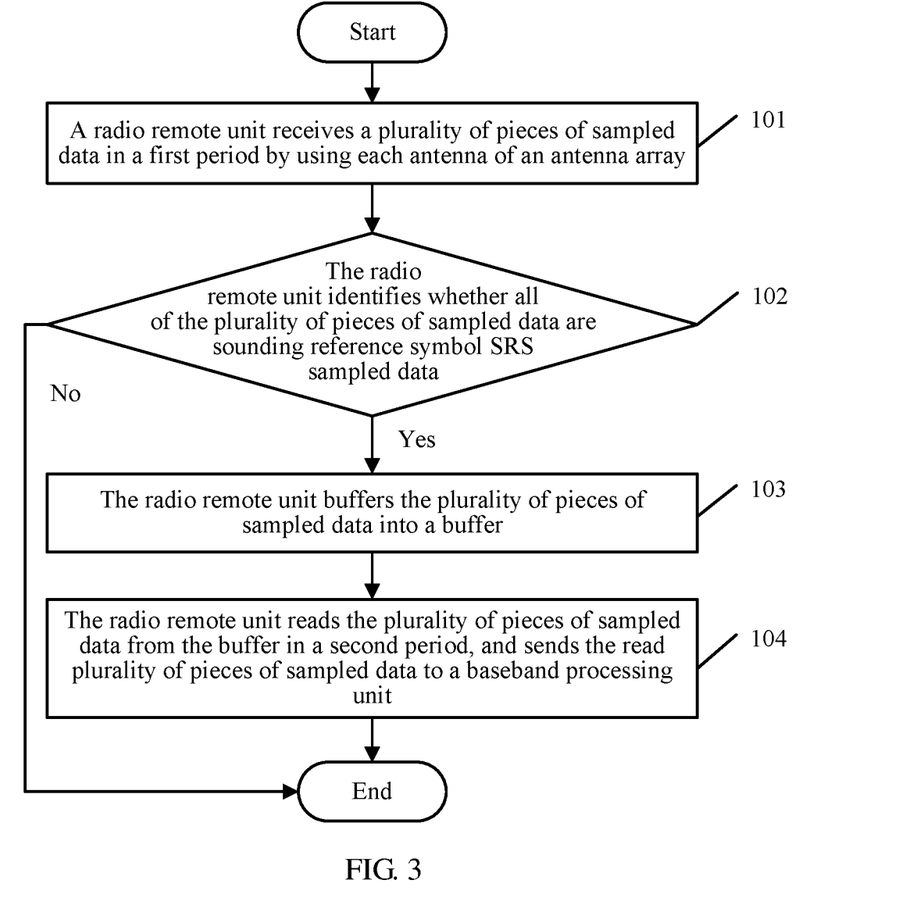
FIG. 3 is a schematic flowchart of a sounding reference symbol transmission method according to an embodiment of the present invention.

Based on the application scenario shown in FIG. 1, referring to FIG. 3, FIG. 3 is a schematic flowchart of a sounding reference symbol transmission method according to an embodiment of the present invention. As shown in FIG. 3, the sounding reference symbol transmission method may include the following steps.

101. A radio remote unit receives a plurality of pieces of sampled data in a first period by using each antenna of an antenna array.

In this embodiment of the present invention, the antenna array may be a large scale antenna array. The large scale antenna array is an antenna array that includes a large quantity of antennas, and generally, the large scale antenna array includes hundreds of antennas.

In this embodiment of the present invention, the radio remote unit receives the plurality of pieces of sampled data at the same time in the first period by using each antenna of the antenna array. For example, if duration of the first period is 0.5 us (microsecond), the radio remote unit receives the plurality of pieces of sampled data at the same time during 0.5 us. The plurality of pieces of sampled data are sent by a plurality of user terminals to the antenna array at the same time, and the plurality of pieces of sampled data belong to sampled data of symbols of different uplink subframes. For example, if there are two user terminals: a user terminal A and a user terminal B, and the antenna array includes 256 antennas, the user terminal A sends a piece of sampled data to each of the 256 antennas at the same time, and when the user terminal A sends the sampled data, the user terminal B also sends a piece of sampled data to each of the 256 antennas at the same time. Therefore, the radio remote unit receives 512 pieces of sampled data at the same time in the first period by using the antenna array.

102. The radio remote unit identifies whether all of the plurality of pieces of sampled data are sounding reference symbol SRS sampled data.

In this embodiment of the present invention, after receiving the plurality of pieces of sampled data at the same time, the radio remote unit identifies whether all of the plurality of pieces of sampled data are SRS sampled data. In actual application, types of the plurality of pieces of sampled data received by the radio remote unit at the same time are the same, that is, all of the plurality of pieces of sampled data are SRS sampled data, or all of the plurality of pieces of sampled data are non-SRS sampled data. If the radio remote unit identifies that all of the plurality of pieces of sampled data are the SRS sampled data, step 103 is performed; or if the radio remote unit identifies that none of the plurality of pieces of sampled data is SRS sampled data (that is, all of the plurality of pieces of sampled data are non-SRS sampled data), optionally, the radio remote unit compresses the plurality of pieces of sampled data, to obtain compressed sampled data, and sends the compressed sampled data to a baseband processing unit. The radio remote unit compresses the plurality of pieces of non-SRS sampled data, and then transmits the compressed sampled data to the baseband processing unit. This can effectively reduce bandwidth required for transmitting the non-SRS sampled data.

In an optional implementation, before performing step 101, the radio remote unit may further perform the following steps:

(11). The radio remote unit receives identification information that is sent by the baseband processing unit and that is used for identifying SRS sampled data, where the identification information includes a receiving time point and a time length.

Correspondingly, a specific implementation in which the radio remote unit identifies whether all of the plurality of pieces of sampled data are sounding reference symbol SRS sampled data may include the following steps:

(21) The radio remote unit detects whether a receiving time of each of the plurality of pieces of sampled data is later than the receiving time point, and whether a time interval between the receiving time of each of the plurality of pieces of sampled data and the receiving time point is less than the time length.

(22) If the receiving time of each of the plurality of pieces of sampled data is later than the receiving time point, and the time interval between the receiving time of each of the plurality of pieces of sampled data and the receiving time point is less than the time length, the radio remote unit determines that all of the plurality of pieces of sampled data are the SRS sampled data.

In this implementation, for example, if the time point is 10:00, and the time length is 66.7 milliseconds, after receiving the plurality of pieces of sampled data at the same time, the radio remote unit detects whether receiving times of the received plurality of pieces of sampled data are later than 10:00; and if yes, the radio remote unit continues to detect whether time intervals between the receiving times and 10:00 are less than 66.7 milliseconds. If the time intervals between the receiving times and 10:00 are less than 66.7 milliseconds, the radio remote unit determines that all of the received plurality of pieces of sampled data are the SRS sampled data.

By implementing this implementation, the radio remote unit can accurately identify whether all of the received plurality of pieces of sampled data are the SRS sampled data.

103. The radio remote unit buffers the plurality of pieces of sampled data into a buffer.

In this embodiment of the present invention, if the radio remote unit identifies that all of the plurality of pieces of sampled data are the SRS sampled data, the radio remote unit buffers all of the plurality of pieces of sampled data into the buffer.

104. The radio remote unit reads the plurality of pieces of sampled data from the buffer in a second period, and sends the read plurality of pieces of sampled data to a baseband processing unit.

In this embodiment of the present invention, after the radio remote unit buffers the plurality of pieces of sampled data into the buffer, the radio remote unit reads the buffered sampled data from the buffer in the second period, and sends the read sampled data to the baseband processing unit. Duration of the second period is longer than duration of the first period.

For example, if the duration of the first period is 1 us (millisecond), and a data amount of the plurality of pieces of sampled data received by the radio remote unit at the same time is 10 Mbits, when the radio remote unit does not buffer the plurality of pieces of sampled data, the radio remote unit needs to transmit the sampled data of 10 Mbits to the baseband processing unit within 1 us. Therefore, if the radio remote unit sends the plurality of pieces of sampled data to the baseband processing unit at a constant speed, a rate required for transmitting the plurality of pieces of sampled data is at least 10 Mbits/us. When the radio remote unit buffers the plurality of pieces of sampled data, the radio remote unit may transmit the plurality of pieces of sampled data to the baseband processing unit in the second period whose duration is longer than that of the first period. Therefore, if the duration of the second period is 2 us, the radio remote unit may transmit the plurality of pieces of sampled data to the baseband processing unit at a rate of only 5 Mbits/us. Therefore, in the present invention, the received plurality of pieces of sampled data are buffered, so that sending times of the plurality of pieces of sampled data are prolonged, and therefore, bandwidth required for transmitting SRS sampled data can be reduced.

In actual application, a transmission period of a periodical SRS may be 2 milliseconds, 5 milliseconds, 10 milliseconds, 20 milliseconds, 40 milliseconds, 80 milliseconds, 160 milliseconds, or 320 milliseconds. In this embodiment of the present invention, if the plurality of pieces of sampled data received by the radio remote unit are periodical SRS sampled data, a case in which a buffer capacity is not enough is avoided, and therefore, transmission of SRS sampled data in the next period is not affected, provided that the radio remote unit sends all of the SRS sampled data buffered in the second period to the baseband processing unit before receiving SRS sampled data of a next period.

In an optional implementation, if the radio remote unit operates in a Time Division Long Term Evolution (TD-LTE) system or another system in which uplink subframes are not continuously received, the radio remote unit reads the buffered a plurality of pieces of sampled data in the second period in a downlink timeslot, and sends the read plurality of pieces of sampled data to the baseband processing unit.

In the TD-LTE system, a length of one radio frame is 10 milliseconds, and each radio frame includes 10 subframes whose lengths are 1 millisecond. Each common subframe includes two timeslots of 0.5 milliseconds, and each special subframe includes three special timeslots. On a same carrier frequency, an uplink direction and a downlink direction are distinguished by time, that is, in each period of 10 milliseconds, a total of 10 subframes are available in the uplink direction and the downlink direction, and some are uplink subframes while the others are downlink subframes. The uplink subframe is transmitted only in an uplink timeslot, and the downlink subframe is transmitted only in a downlink timeslot.

Figure 4:
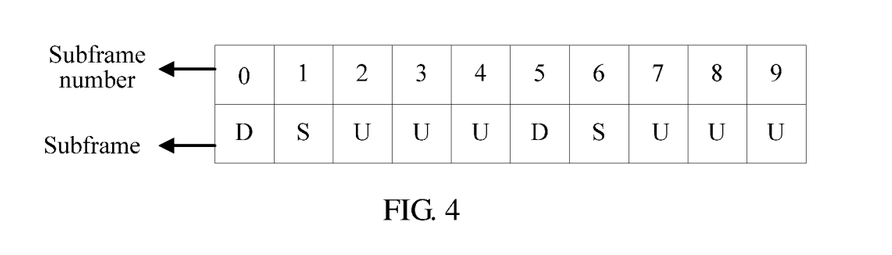
FIG. 4 is a schematic structural diagram of a subframe timeslot allocation according to an embodiment of the present invention.

In this implementation, for example, as shown in FIG. 4, if a period of an SRS is 5 milliseconds, and the SRS is included in an uplink subframe whose number is 2, the radio remote unit may send SRS sampled data to the baseband processing unit in a downlink timeslot corresponding to a downlink subframe whose number is 5.

It is found in practice that the radio remote unit does not receive an uplink subframe in the downlink timeslot by using the antenna array, and therefore, no uplink subframe is sent by the radio remote unit to the baseband processing unit in the downlink timeslot. This wastes uplink optical fiber resources. In this implementation, the SRS sampled data in the buffer is also transmitted to the baseband processing unit in the downlink timeslot, so that a waste of optical fiber resources is reduced. In addition, the downlink timeslot is much longer than the duration of the first period, SRS sampled data may be transmitted in the downlink timeslot in the second period whose duration is longer than that of the first period, so that a time required for transmitting the SRS sampled data may be prolonged, and bandwidth required for transmitting the SRS sampled data is reduced.

In an optional implementation, a rate of processing SRS sampled data by the baseband processing unit is less than a rate of receiving SRS sampled data by the radio remote unit; and a rate of sending, by the radio remote unit to the baseband processing unit, the SRS sampled data that is read from the buffer is less than or equal to the rate of processing the SRS sampled data by the baseband processing unit.

For example, if the duration of the first period is 1 us, and the data amount of the plurality of pieces of sampled data received by the radio remote unit at the same time is 10 Mbits, the rate of receiving SRS sampled data by the radio remote unit is 10 Mbits/us. If the rate of processing SRS sampled data by the baseband processing unit is 1 Mbits/us, the rate of sending the read SRS sampled data by the radio remote unit to the baseband processing unit is less than or equal to 1 Mbits/us (that is, the duration of the second period is greater than or equal to 10 us).

In actual application, the baseband processing unit has a limited capability of processing SRS sampled data. For example, if a large scale antenna array includes 256 antennas, and the baseband processing unit can process, at a time, SRS sampled data received by only 8 antennas, when the baseband processing unit receives, at a time, SRS sampled data that is sent by the radio remote unit and that is received by the 256 antennas, the baseband processing unit buffers SRS sampled data received by 248 antennas of the 256 antennas into the buffer in the baseband processing unit. Therefore, according to this implementation, the rate of sending SRS sampled data by the radio remote unit to the baseband processing unit is less than or equal to the rate of processing SRS sampled data by the baseband processing unit, so that the baseband processing unit does not need to buffer redundant SRS sampled data, and therefore, the baseband processing unit can save buffer resources.

In an optional implementation, a specific implementation in which the radio remote unit buffers the plurality of pieces of sampled data into the buffer may include the following steps:

(31) The radio remote unit groups the plurality of pieces of sampled data, to obtain a plurality of groups of sampled data.

(32) For each of the groups of sampled data, the radio remote unit compresses sampled data included in the group of sampled data, to obtain compressed sampled data corresponding to the group of sampled data.

(33) The radio remote unit buffers the compressed sampled data corresponding to each of the groups of sampled data into the buffer.

Correspondingly, a specific implementation in which the radio remote unit reads the plurality of pieces of sampled data from the buffer in a second period, and sends the read plurality of pieces of sampled data to a baseband processing unit may include the following step:

(41) The radio remote unit reads, from the buffer in the second period, the compressed sampled data corresponding to each of the groups of sampled data, and sends the read compressed sampled data corresponding to each of the groups of sampled data to the baseband processing unit.

In this implementation, optionally, antenna groups are preset for the radio remote unit. For example, if there are 100 antennas, the antenna groups may include a group including the $1^{st}$ to the $50^{th}$ antennas and another group including the $51^{st}$ to the $100^{th}$ antennas. When grouping the received plurality of pieces of sampled data, the radio remote unit includes sampled data received by the $1^{st}$ to the $50^{th}$ antennas in a group, includes sampled data received by the $51^{st}$ to the $100^{th}$ antennas in a group, and obtains a total of two groups of sampled data. The radio remote unit separately compresses sampled data included in each of the groups of sampled data, and compresses sampled data in each of the groups of sampled data into a piece of sampled data. For example, the radio remote unit compresses sampled data received by the $1^{st}$ to the $50^{th}$ antennas into a piece of sampled data, and compresses sampled data received by the $51^{st}$ to the $100^{th}$ antennas into another piece of sampled data. A specific implementation in which the radio remote unit compresses sampled data in the group of sampled data into a piece of sampled data may be: The radio remote unit adds up all sampled data in the group of sampled data, and data obtained by means of adding is the compressed sampled data corresponding to the group of sampled data.

Optionally, when compressing the plurality of pieces of sampled data, the radio remote unit may randomly divide the plurality of pieces of sampled data into a preset quantity of groups of sampled data; and the radio remote unit compresses sampled data in each of the groups of sampled data, to obtain compressed sampled data corresponding to each of the groups of sampled data. For example, if there are 256 pieces of sampled data, and the sampled data needs to be divided into 64 groups of sampled data, the radio remote unit randomly groups 4 pieces of sampled data into a group of sampled data; and after obtaining the 64 groups of sampled data, for each of the groups of sampled data, the radio remote unit compresses 4 pieces of sampled data in the group of sampled data into a piece of sampled data.

In this implementation, after obtaining the compressed sampled data corresponding to each of the groups of sampled data, the radio remote unit buffers the compressed sampled data into the buffer. The radio remote unit reads all compressed sampled data from the buffer, and sends the read compressed sampled data to the baseband processing unit. For example, the radio remote unit divides 256 pieces of sampled data into 64 groups of sampled data, and obtains 64 pieces of compressed sampled data; and the radio remote unit buffers all of the 64 pieces of compressed sampled data into the buffer, reads the 64 pieces of compressed sampled data from the buffer in the second period, and sends the compressed sampled data to the baseband processing unit.

In actual application, as a quantity of base station antennas increases, complexity of processing SRS sampled data by the baseband processing unit increases in a nonlinear manner. For example, if there are 100 antennas, the baseband processing unit needs to process SRS sampled data received by the 100 antennas; and if there are 256 antennas, the baseband processing unit needs to process SRS sampled data received by the 256 antennas. In this implementation, the received plurality of pieces of sampled data are grouped and compressed, so that an amount of SRS sampled data processed by the baseband processing unit can be reduced (for example, SRS sampled data received by 100 antennas are divided into 10 groups, 10 pieces of compressed SRS sampled data are finally obtained, and this is equivalent to a fact that the baseband processing unit processes SRS sampled data corresponding to only 10 antennas), and complexity of processing the SRS sampled data by the baseband processing unit is significantly reduced. In addition, a size of SRS sampled data can be reduced by compressing SRS sampled data, thereby helping reduce bandwidth for transmitting SRS sampled data. In addition, the radio remote unit sends all the compressed sampled data to the baseband processing unit for processing, thereby helping reduce a loss of sampled data.

In the method described in FIG. 3, after receiving the plurality of pieces of sampled data in the first period by using each antenna of the antenna array, the radio remote unit identifies whether all of the plurality of pieces of sampled data are sounding reference symbol SRS sampled data. If all of the plurality of pieces of sampled data are the SRS sampled data, the radio remote unit buffers the plurality of pieces of sampled data into the buffer. The radio remote unit reads the sampled data in the second period whose duration is longer than that of the first period, and sends the read sampled data to the baseband processing unit. According to implementation of this embodiment of the present invention, after the radio remote unit buffers the plurality of pieces of sampled data, a time for transmitting the SRS sampled data is prolonged, so that bandwidth required for transmitting the SRS sampled data can be reduced, thereby helping lower a network deployment requirement.

Figure 5:
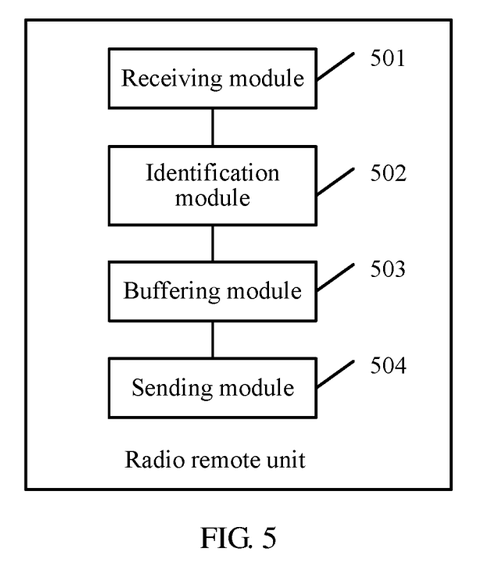
FIG. 5 is a schematic structural diagram of a radio remote unit according to an embodiment of the present invention.

Referring to FIG. 5, FIG. 5 is a schematic structural diagram of a radio remote unit according to an embodiment of the present invention. As shown in FIG. 5, the radio remote unit may include a receiving module 501, an identification module 502, a buffering module 503, and a sending module 504.

The receiving module 501 is configured to receive a plurality of pieces of sampled data in a first period by using each antenna of an antenna array.

The identification module 502 is configured to identify whether all of the plurality of pieces of sampled data received by the receiving module 501 are sounding reference symbol SRS sampled data.

The buffering module 503 is configured to: when the identification module 502 identifies that all of the plurality of pieces of sampled data are the SRS sampled data, buffer the plurality of pieces of sampled data into a buffer.

The sending module 504 is configured to: read, from the buffer in a second period, the plurality of pieces of sampled data buffered by the buffering module 503, and send the read plurality of pieces of sampled data to a baseband processing unit, where duration of the second period is longer than duration of the first period.

In an optional implementation, a rate of processing SRS sampled data by the baseband processing unit is less than a rate of receiving SRS sampled data by the receiving module 501; and a rate of sending, by the sending module 504 to the baseband processing unit, the SRS sampled data that is read from the buffer is less than or equal to the rate of processing the SRS sampled data by the baseband processing unit.

In an optional implementation, the sending module 504 is specifically configured to:

read, from the buffer in the second period in a downlink timeslot, the plurality of pieces of sampled data buffered by the buffering module 503, and send the read plurality of pieces of sampled data to the baseband processing unit.

Figure 6:
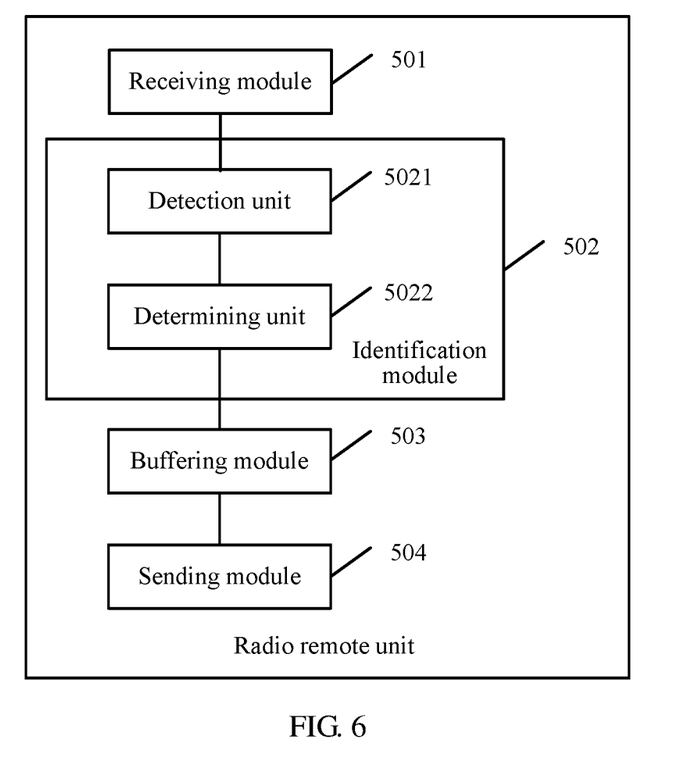
FIG. 6 is a schematic structural diagram of another radio remote unit according to an embodiment of the present invention.

Also referring to FIG. 6, FIG. 6 is a schematic structural diagram of another radio remote unit according to an embodiment of the present invention. The radio remote unit shown in FIG. 6 is obtained by optimizing the radio remote unit shown in FIG. 5. Compared with the radio remote unit shown in FIG. 5, the radio remote unit shown in FIG. 6 includes all the modules of the radio remote unit shown in FIG. 5, and the identification module 502 may include a detection unit 5021 and a determining unit 5022.

The receiving module 501 is further configured to: before the receiving module 501 receives the plurality of pieces of sampled data in the first period by using each antenna of the antenna array, receive identification information that is sent by the baseband processing unit and that is used for identifying SRS sampled data, where the identification information includes a receiving time point and a time length.

The detection unit 5021 is configured to detect whether a receiving time of each of the plurality of pieces of sampled data received by the receiving module 501 is later than the receiving time point received by the receiving module 501, and whether a time interval between the receiving time of each piece of sampled data and the receiving time point received by the receiving module 501 is less than the time length received by the receiving module 501.

The determining unit 5022 is configured to: when the detection unit 5021 detects that the receiving time of each piece of sampled data is later than the receiving time point received by the receiving module 501, and the time interval between the receiving time of each piece of sampled data and the receiving time point received by the receiving module 501 is less than the time length received by the receiving module 501, determine that all of the plurality of pieces of sampled data are the SRS sampled data.

In this embodiment of the present invention, after the determining unit 5022 determines that all of the plurality of pieces of sampled data are the SRS sampled data, the buffering module 503 is triggered to buffer the plurality of pieces of sampled data into the buffer.

Figure 7:
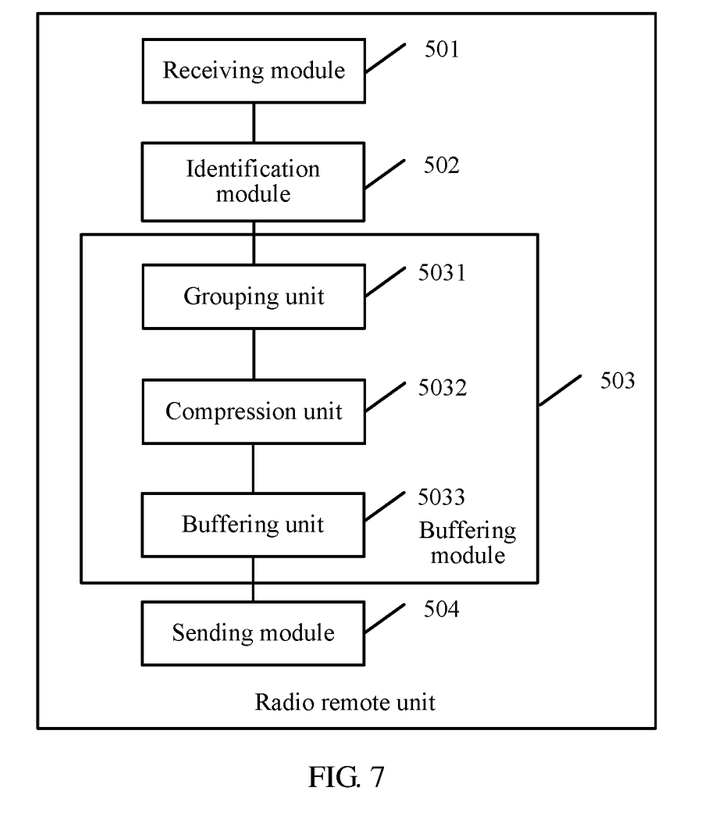
FIG. 7 is a schematic structural diagram of another radio remote unit according to an embodiment of the present invention.

Also referring to FIG. 7, FIG. 7 is a schematic structural diagram of another radio remote unit according to an embodiment of the present invention. The radio remote unit shown in FIG. 7 is obtained by optimizing the radio remote unit shown in FIG. 5. Compared with the radio remote unit shown in FIG. 5, the radio remote unit shown in FIG. 7 includes all the modules of the radio remote unit shown in FIG. 5, and the buffering module 503 may include a grouping unit 5031, a compression unit 5032, and a buffering unit 5033.

The grouping unit 5031 is configured to group the plurality of pieces of sampled data, to obtain a plurality of groups of sampled data.

In this embodiment of the present invention, after the identification module 502 identifies that all of the plurality of pieces of sampled data are the SRS sampled data, the grouping unit 5031 is triggered to group the plurality of pieces of sampled data, to obtain the plurality of groups of sampled data.

The compression unit 5032 is configured to: for each of the groups of sampled data obtained by the grouping unit 5031, compress sampled data included in the group of sampled data, to obtain compressed sampled data corresponding to the group of sampled data.

The buffering unit 5033 is configured to buffer the compressed sampled data that is obtained by the compression unit 5032 and that is corresponding to each of the groups of sampled data into the buffer.

The sending module 504 is specifically configured to: read, from the buffer in the second period, the compressed sampled data that is buffered by the buffering unit 5033 and that is corresponding to each of the groups of sampled data, and send the read compressed sampled data corresponding to each of the groups of sampled data to the baseband processing unit.

Figure 8:
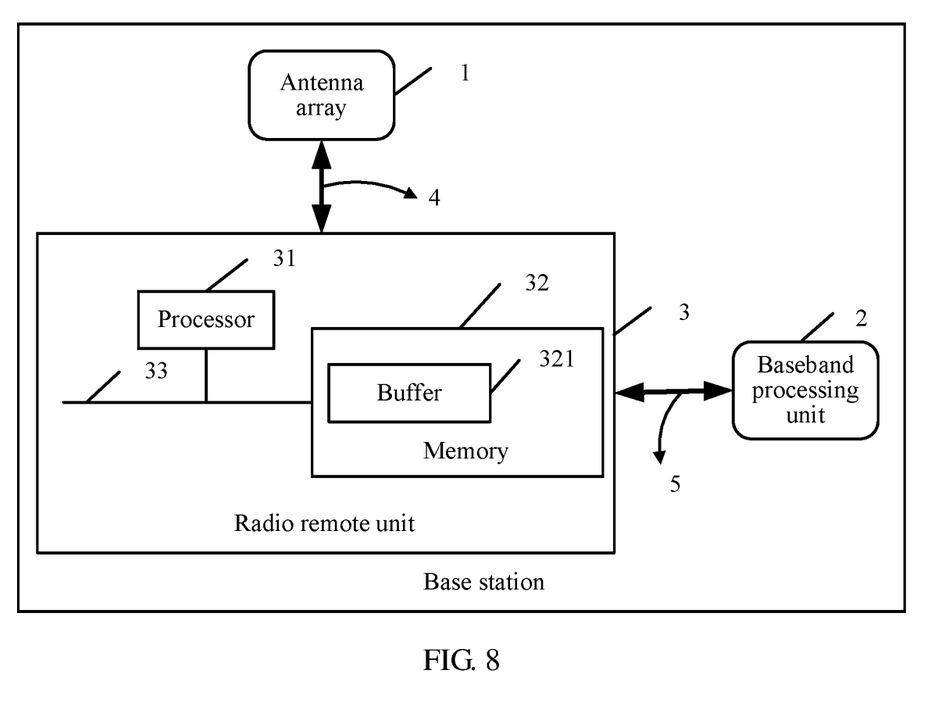
FIG. 8 is a schematic structural diagram of a base station according to an embodiment of the present invention.

Referring to FIG. 8, FIG. 8 is a schematic structural diagram of a base station according to an embodiment of the present invention. As shown in FIG. 8, the base station includes an antenna array 1, a baseband processing unit 2, and a radio remote unit 3. The antenna array 1 is connected to the radio remote unit 3 by using a radio frequency feeder 4, and the radio remote unit 3 is connected to the baseband processing unit 2 by using an optical fiber 5. The radio remote unit 3 may include a processor 31 and a memory 32 that is connected to the processor 31 by using a bus 33. The memory 32 includes a buffer 321. The memory 32 stores a set of program code. The processor 31 is configured to invoke the program code stored in the memory 32, so as to perform the following operations:

receiving a plurality of pieces of sampled data in a first period by using each antenna of an antenna array 1;

identifying whether all of the plurality of pieces of sampled data are sounding reference symbol SRS sampled data;

if all of the plurality of pieces of sampled data are the SRS sampled data, buffering the plurality of pieces of sampled data into a buffer 321; and reading the plurality of pieces of sampled data from the buffer 321 in a second period, and sending the read plurality of pieces of sampled data to the baseband processing unit 2, where duration of the second period is longer than duration of the first period.

In an optional implementation, the processor 31 is configured to invoke the program code stored in the memory 32, so as to further perform the following operation:

receiving identification information that is sent by the baseband processing unit 2 and that is used for identifying SRS sampled data, where the identification information includes a receiving time point and a time length.

A specific manner in which the processor 31 identifies whether all of the plurality of pieces of sampled data are sounding reference symbol SRS sampled data may be:

detecting whether a receiving time of each of the plurality of pieces of sampled data is later than the receiving time point, and whether a time interval between the receiving time of each piece of sampled data and the receiving time point is less than the time length; and if the receiving time of each piece of sampled data is later than the receiving time point, and the time interval between the receiving time of each piece of sampled data and the receiving time point is less than the time length, determining that the plurality of pieces of sampled data are the SRS sampled data.

In an optional implementation, a rate of processing SRS sampled data by the baseband processing unit 2 is less than a rate of receiving SRS sampled data by the processor 31; and a rate of sending, by the processor 31 to the baseband processing unit 2, the SRS sampled data that is read from the buffer 321 is less than or equal to the rate of processing the SRS sampled data by the baseband processing unit 2.

In an optional implementation, a specific manner in which the processor 31 buffers the plurality of pieces of sampled data into the buffer 321 may be:

grouping the plurality of pieces of sampled data, to obtain a plurality of groups of sampled data;

for each of the groups of sampled data, compressing sampled data included in the group of sampled data, to obtain compressed sampled data corresponding to the group of sampled data; and buffering the compressed sampled data corresponding to each of the groups of sampled data into the buffer 321.

A specific manner in which the processor 31 reads the plurality of pieces of sampled data from the buffer 321 in the second period, and sends the read plurality of pieces of sampled data to the baseband processing unit 2 may be:

reading, from the buffer 321 in the second period, the compressed sampled data corresponding to each of the groups of sampled data, and sending the read compressed sampled data corresponding to each of the groups of sampled data to the baseband processing unit 2.

In an optional implementation, a specific manner in which the processor 31 reads the plurality of pieces of sampled data from the buffer 321 in the second period, and sends the read plurality of pieces of sampled data to the baseband processing unit 2 may be:

reading the plurality of pieces of sampled data from the buffer 321 in the second period in a downlink timeslot, and sending the read plurality of pieces of sampled data to the baseband processing unit 2.

According to the radio remote unit described in FIG. 5 to FIG. 8, the radio remote unit identifies the received sampled data, and buffers the identified SRS sampled data, so that a time for transmitting the SRS sampled data is prolonged. Therefore, bandwidth required for transmitting the SRS sampled data can be reduced, thereby helping lower a network deployment requirement.

It should be noted that, in the foregoing embodiments, the description of each embodiment has respective focuses. For a part that is not described in detail in an embodiment, reference may be made to related descriptions in other embodiments. In addition, a person skilled in the art should also appreciate that all the embodiments described in the specification are example embodiments, and the related actions and modules are not necessarily mandatory to the present invention.

A sequence of the steps of the method in the embodiments of the present invention may be adjusted, and the steps may also be combined or deleted according to an actual requirement.

The modules or the units in the radio remote unit in the embodiments of the present invention may be combined, divided, or deleted according to an actual requirement.

The modules of the embodiments of the present invention may be executed by a universal integrated circuit, such as a CPU (central processing unit) or an ASIC (application specific integrated circuit).

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (RAM).

In short, the foregoing descriptions are merely example embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A sounding reference symbol (SRS) transmission method comprising:
   receiving, by a radio remote unit (RRU), a plurality of pieces of sampled data in a first period by using each antenna of an antenna array;
   identifying, by the RRU, whether all of the plurality of pieces of sampled data are SRS sampled data;
   in case that all of the plurality of pieces of sampled data are the SRS sampled data, buffering, by the RRU, the plurality of pieces of sampled data into a buffer; and
   reading, by the RRU, the plurality of pieces of sampled data from the buffer in a second period, and sending the read plurality of pieces of sampled data to a baseband processing unit (BBU), wherein duration of the second period is longer than duration of the first period.

2. The method according to claim 1, wherein before receiving the plurality of pieces of sampled data in the first period by using each antenna of the antenna array, the method further comprises:
   receiving, by the RRU, identification information that is sent by the BBU and that is used for identifying the SRS sampled data, wherein the identification information comprises a receiving time point and a time length; and
   wherein identifying whether all of the plurality of pieces of sampled data are the SRS sampled data comprises:
   detecting, by the RRU, whether a receiving time of each of the plurality of pieces of sampled data is later than the receiving time point, and whether a time interval between the receiving time of each piece of sampled data and the receiving time point is less than the time length; and
   if the receiving time of each piece of sampled data is later than the receiving time point, and the time interval between the receiving time of each piece of sampled data and the receiving time point is less than the time length, determining, by the RRU, that all of the plurality of pieces of sampled data are the SRS sampled data.

3. The method according to claim 1, wherein a rate of processing the SRS sampled data by the BBU is less than a rate of receiving the SRS sampled data by the RRU; and a rate of sending, by the RRU to the BBU, the SRS sampled data that is read from the buffer is less than or equal to the rate of processing the SRS sampled data by the BBU.

4. The method according to claim 1, wherein buffering the plurality of pieces of sampled data into the buffer comprises:
   grouping, by the RRU, the plurality of pieces of sampled data, to obtain a plurality of groups of sampled data;
   for each of the groups of sampled data, compressing, by the RRU, sampled data comprised in the group of sampled data, to obtain compressed sampled data associated with the group of sampled data; and
   buffering, by the RRU, the compressed sampled data associated with each of the groups of sampled data into the buffer; and
   wherein reading the plurality of pieces of sampled data from the buffer in the second period, and sending the read plurality of pieces of sampled data to the BBU comprises:
   reading, by the RRU from the buffer in the second period, the compressed sampled data associated with each of the groups of sampled data, and sending the read compressed sampled data associated with each of the groups of sampled data to the BBU.

5. The method according to claim 1, wherein reading the plurality of pieces of sampled data from the buffer in the second period, and sending the read plurality of pieces of sampled data to the BBU comprises:
   reading, by the RRU, the plurality of pieces of sampled data from the buffer in the second period in a downlink timeslot, and sending the read plurality of pieces of sampled data to the BBU.

6. A radio remote unit (RRU) comprising:
   a processor; and
   a non-transitory computer-readable storage medium coupled to the processor and storing programming instructions for execution by the processor, wherein the programming instructions instruct the processor to:
    receive a plurality of pieces of sampled data in a first period by using each antenna of an antenna array;
    identify whether all of the plurality of pieces of sampled data are sounding reference symbol (SRS) sampled data;
    in case that all of the plurality of pieces of sampled data are the SRS sampled data, buffer the plurality of pieces of sampled data into a buffer; and
    read the plurality of pieces of sampled data from the buffer in a second period, and send the read plurality of pieces of sampled data to a baseband processing unit (BBU), wherein duration of the second period is longer than duration of the first period.

7. The RRU according to claim 6, wherein the programming instructions instruct the processor to:
    receive identification information that is sent by the BBU and that is used for identifying the SRS sampled data before receiving the plurality of pieces of sampled data in the first period by using each antenna of the antenna array, wherein the identification information comprises a receiving time point and a time length;
    detect whether a receiving time of each of the plurality of pieces of sampled data is later than the receiving time point, and whether a time interval between the receiving time of each piece of sampled data and the receiving time point is less than the time length; and
    when it is detected that the receiving time of each piece of sampled data is later than the receiving time point, and the time interval between the receiving time of each piece of sampled data and the receiving time point is less than the time length, determine that all of the plurality of pieces of sampled data are the SRS sampled data.

8. The RRU according to claim 6, wherein a rate of processing the SRS sampled data by the BBU is less than a rate of receiving the SRS sampled data; and a rate of sending, to the BBU, the SRS sampled data that is read from the buffer is less than or equal to the rate of processing the SRS sampled data by the BBU.

9. The RRU according to claim 6, wherein the programming instructions instruct the processor to:
    group the plurality of pieces of sampled data, to obtain a plurality of groups of sampled data;
    for each of the groups of sampled data, compress sampled data comprised in the group of sampled data, to obtain compressed sampled data associated with the group of sampled data; and
    buffer the compressed sampled data associated with each of the groups of sampled data into the buffer; and
    read, from the buffer in the second period, the compressed sampled data associated with each of the groups of sampled data, and send the read compressed sampled data associated with each of the groups of sampled data to the BBU.

10. The RRU according to claim 6, wherein the programming instructions instruct the processor to:
    read the plurality of pieces of sampled data from the buffer in the second period in a downlink timeslot, and send the read plurality of pieces of sampled data to the BBU.

11. A base station comprising an antenna array, a baseband processing unit (BBU), and a radio remote unit (RRU), wherein the antenna array is connected to the RRU, and the RRU is connected to the BBU, and the RRU is configured to:
    read a plurality of pieces of sampled data from a buffer in a second period; and
    send the read plurality of pieces of sampled data to the BBU,
        wherein all of the plurality of pieces of sampled data are sounding reference symbol (SRS) sampled data and received by the RRU in a first period by using each antenna of the antenna array, duration of the second period is longer than duration of the first period.

12. The base station according to claim 11, wherein the RRU is further configured to:
    receive identification information that is sent by the BBU and that is used for identifying the SRS sampled data, wherein the identification information comprises a receiving time point and a time length.

13. The base station according to claim 12, wherein all of the plurality of pieces of sampled data are the SRS sampled data in case that a receiving time of each piece of sampled data is later than the receiving time point, and a time interval between the receiving time of each piece of sampled data and the receiving time point is less than the time length.

14. The base station according to claim 11, wherein the read plurality of pieces of sampled data are compressed sampled data associated with each group of the plurality of pieces of sampled data.

15. The base station according to claim 11, wherein the second period is in a downlink time slot.

16. The base station according to claim 11, wherein a rate of processing the SRS sampled data by the BBU is less than a rate of receiving the SRS sampled data by the RRU; and a rate of sending, by the RRU to the BBU, the read SRS sampled data is less than or equal to the rate of processing the SRS sampled data by the BBU.

* * * * *